United States Patent [19]

Bourque

[11] Patent Number: 5,436,427
[45] Date of Patent: Jul. 25, 1995

[54] WELDING CONTROL UNIT POWER SUPPLY

[75] Inventor: Denis Bourque, Neufchatel, Canada

[73] Assignee: Ultra Optec, Inc., Québec, Canada

[21] Appl. No.: 225,583

[22] Filed: Apr. 11, 1994

[51] Int. Cl.⁶ .............................. B23K 9/10; B23K 9/12
[52] U.S. Cl. .............................. 219/130.1; 219/130.01; 219/130.21
[58] Field of Search ............ 219/130.01, 130.1, 130.21, 219/130.31, 130.32, 130.33

[56] References Cited

U.S. PATENT DOCUMENTS

| | | | |
|---|---|---|---|
| 4,151,396 | 4/1979 | Veal | 219/132 |
| 4,205,211 | 5/1980 | Serlin et al. | 219/76.13 |
| 4,417,129 | 11/1983 | Young | 219/130.32 |
| 4,450,340 | 5/1984 | Corrigall et al. | 219/132 |
| 4,508,954 | 4/1985 | Kroll | 219/132 |
| 4,514,615 | 4/1985 | Simoneau et al. | 219/132 |
| 4,570,050 | 2/1986 | Veal et al. | 219/130.31 |
| 4,638,146 | 1/1987 | Koyama | 219/147 |
| 4,769,754 | 9/1988 | Reynolds et al. | 219/130.21 |

FOREIGN PATENT DOCUMENTS 1473510  5/1977  United Kingdom ........... 219/130.32

*Primary Examiner*—Clifford C. Shaw
*Attorney, Agent, or Firm*—Collard & Roe

[57] ABSTRACT

A welding control unit power supply for providing a substantially constant and powerful DC supply voltage to the internal electronic components of the welding control unit. The DC supply voltage is derived from the high current welding power supply. The DC supply voltage is maintained substantially constant by means of the switching control circuit even upon occurrence of significant voltage variations in the welding power supply. The welding control unit circuit includes a permanently operating failure detection circuit.

13 Claims, 4 Drawing Sheets

WELDING CONTROL UNIT POWER SUPPLY

BACKGROUND OF THE INVENTION

1. Field of the Invention

The present invention generally relates to electric circuits especially adapted to assist soldering or welding machine tools, and more particularly to a welding control unit power supply for providing a substantially constant and powerful DC supply voltage derived from a high current welding power supply, and a welding control unit including the welding control unit power supply, for controlling the welding power supply provided by a welding machine (or a welding power source) to an electrode for welding a workpiece.

2. Description of the Related Art

It is a known problem with arc welding devices that welders are commonly subjected to potentially dangerous electric shocks as when working in a damp environment or when replacing a consumed electrode. Various attempts have been made in the art to increase the welder's safety, and from these attempts have evolved several manually or automatically operated welding control circuits for reducing electric shock hazards due to high open circuit voltages.

The welding control circuit of Simoneau et al. U.S. Pat. No. 4,514,615 is of particular interest in that it is relatively efficient, reliable and fast operating. The control circuit is based on detection of the impedance between the electrode and a workpiece so as to switch off the welding power supply to the electrode except when the detected impedance decreases under a predetermined threshold corresponding to a valid arc welding condition. The control circuit has however no provision with regard to the DC supply voltage source required for operation, nor with a fail-safe circuit to detect failure of the welding switch. In general, such a control circuit uses at least one fan for cooling purposes. However, to obtain an optimal output from the fan, its supply voltage must be highly stable.

Kroll U.S. Pat. No. 4,508,954 describes a welding system electrically supplied by the DC or AC welding power supply provided by a welding machine. The supply voltage required for operating a wire feed motor is derived from a bridge rectifier, acting as a crude voltage regulator. Several switches must be triggered during the system operation, and the supply voltage is subjected to significant variations in the welding power supply.

Corrigall et al. U.S. Pat. No. 4,450,340 describes a welding system equipped with a voltage reducing circuit which reduces the system output to a standby voltage lower than the full open circuit voltage. The voltage reducing circuit is provided with a fail-safe circuit whose operation is timed by an R-C circuit, so as to detect a voltage reduction failure after a predetermined time period.

In the prior art welding control circuit, no effective DC supply voltage source has been constructed to provide a substantially constant and powerful DC supply voltage derived from the high current welding power supply provided by a welding machine, voltage which must remain constant even upon occurrence of significant voltage variations in the welding power supply. Also, no prior art welding control circuit has been equipped with a failure detector which permanently detects a failure of the welding switch with respect to welding current and voltage conditions.

OBJECTS OF THE INVENTION

It is therefore an object of the invention to provide a welding control unit power supply for providing a substantially constant and powerful DC supply voltage derived from a high current welding power supply, even upon occurrence of significant voltage variations in the welding power supply.

It is another object of the invention to also provide a welding control unit for controlling the welding power supply provided by a welding machine to an electrode for welding a workpiece, including the aforesaid welding control unit power supply.

It is a further object of the invention to provide such a welding control unit which is efficient, reliable and fast operating, and which is further provided with a failure detector which permanently detects a failure of the welding switch with respect to welding current and voltage conditions.

SUMMARY OF THE INVENTION

According to the present invention, there is provided a welding control unit power supply for providing a substantially constant and powerful DC supply voltage derived from a high current welding power supply, comprising:

a high frequency transformer including a primary winding for receiving the welding power supply, and a secondary winding;

an ON-OFF switch means connected in series with said primary winding;

switching control means for alternately triggering said ON-OFF switch means as a function of a voltage of the welding power supply; and a rectifier-filter circuit connected in series with said secondary winding for producing said DC supply voltage;

whereby said DC supply voltage is maintained substantially constant by means of said switching control means even upon occurrence of significant voltage variations in the welding power supply.

According to the present invention, there is also provided a welding control unit for controlling a high current welding power supply provided by a welding power source to an electrode for welding a workpiece, comprising:

input means for receiving the welding power supply from the welding power source;

output means respectively connectable to the welding electrode and the workpiece;

a power supply for providing a substantially constant and powerful DC supply voltage derived from the welding power supply, said power supply comprising:

a high frequency transformer including a primary winding connected to said input means, and a secondary winding;

an ON-OFF switch means connected in series with said primary winding;

switching control means for alternately triggering said ON-OFF switch means as a function of a voltage of the welding power supply; and a rectifier-filter circuit connected in series with said secondary winding for producing said DC supply voltage;

welding switch means connected between said input means and said output means, for controlling the welding power supply to the electrode; and welding control means having a supply input for receiving said DC supply voltage, a detecting input for detecting a contact between the electrode and the workpiece, and a control output for operating said welding switch means as a function of the detected contact;

whereby said DC supply voltage is maintained substantially constant by means of said switching control means even upon occurrence of significant voltage variations in the welding power supply.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF THE PREFERRED EMBODIMENTS

Figure 1:
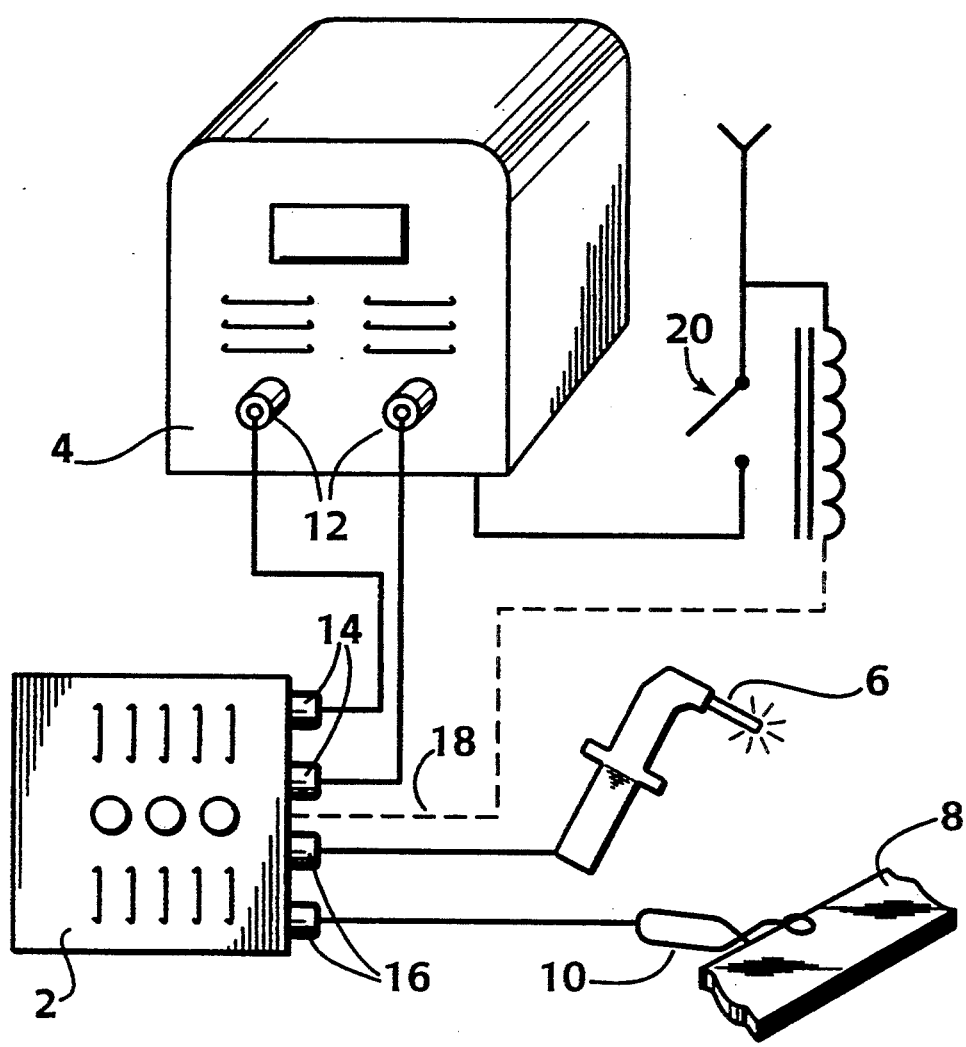
FIG. 1 shows a welding control unit according to the present invention, connected to a welding power machine, a contactor, an electrode and a ground return terminal.

In the following description and in the drawings, the same numerals refer to the same elements.

Referring to FIG. 1, the welding control unit 2 according to the present invention is connectable between a welding power machine 4 delivering a high current welding power supply, and an electrode 6 for welding a workpiece 8. The welding control unit 2 protects welders against electric shock hazards during the arc welding process. The protection is ensured by reducing the voltage between the welding electrode 6 and the workpiece 8 (or the ground return terminal 10). The voltage appearing on the output terminals 12 of the welding power machine 4 is generally ranging between 80 to 100 volts. When the welder works in damp conditions, a current may flow across his body and cause indispositions, an accident or place the welder in a situation where he is unable to carry out the job. The welding control unit 2 reduces the voltage during non-welding periods by permanently monitoring the contact between the electrode 6 and the workpiece 8 so as to "switch off" the electrode 6 when there is no arc welding contact.

The welding control unit 2 has a pair of input terminals 14 for connection to the output terminals 12 of the welding power machine 4, and a pair of output terminals 16 for connection respectively to the electrode 6 and the ground return terminal 10. The welding control unit 2 may also have a contactor line 18 (shown in dotted lines) for connection to an optional contactor 20.

Figure 2:
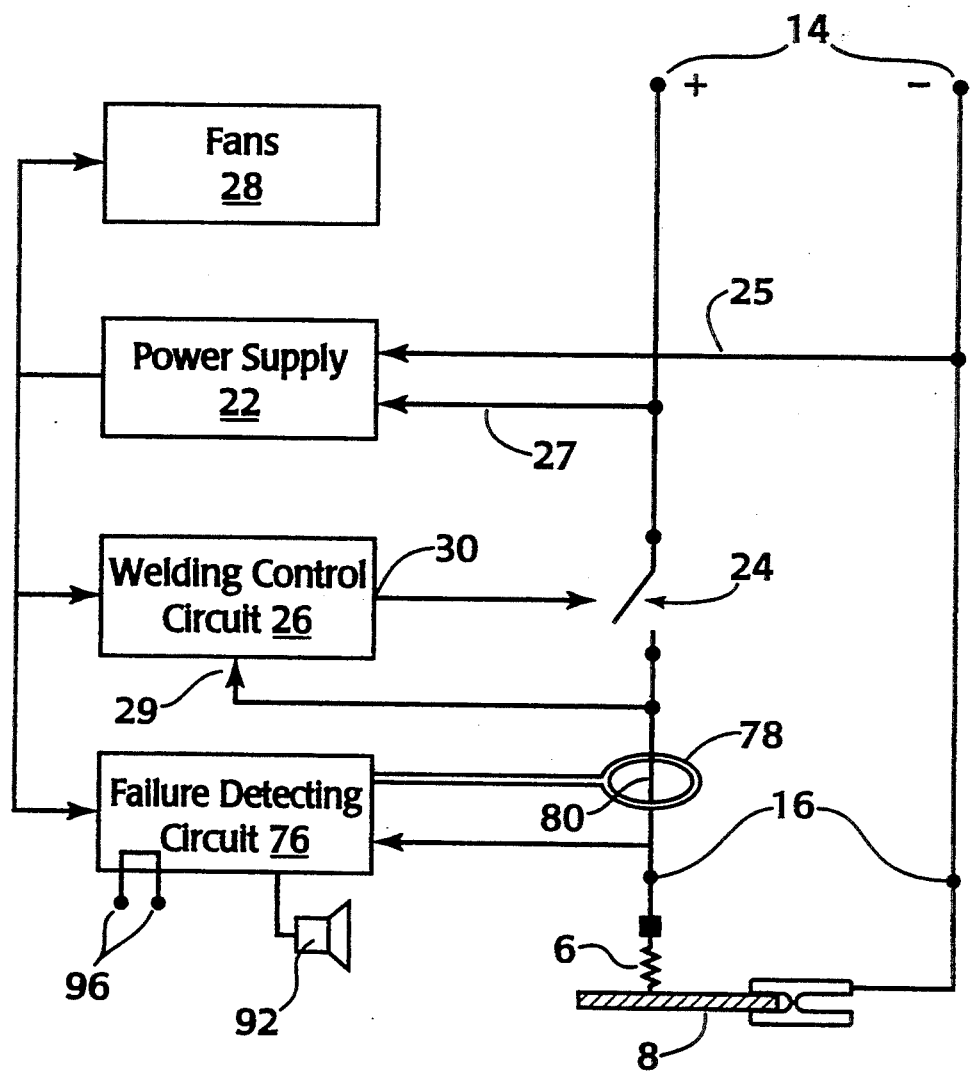
FIG. 2 shows a schematic diagram of the welding control unit according to the present invention.

Referring to FIGS. 1 and 2, the welding control unit 2 comprises a power supply 22 for providing a substantially constant and powerful DC supply voltage derived from the welding power supply received at the input terminals 14. Such a DC supply voltage is required for operation of various electronic components forming the welding control unit 2 and other electrical devices such as air cooling fans 28. The welding control unit 2 also comprises a welding power switch 24 connected between the input and the output terminals 14, 16, for controlling the welding power supply to the electrode 6. The power switch 24 may conveniently comprise a solid state switch. The power switch 24 is controlled by means of a welding control circuit 26 supplied by the DC supply voltage provided by the power supply 22. The welding control circuit 26 has a detecting input 29 for detecting a contact between the electrode 6 and the workpiece 8, and a control output 30 for operating the power switch 24 as a function of the detected contact. Preferably but not restrictively, the welding power switch 24 and the welding control circuit 26 may conveniently be constructed according to the teaching of Simoneau et al. U.S. Pat. No. 4,514,615, i.e. based on detection of the impedance between the electrode 6 and the workpiece 8, for achieving a very efficient control over the welding power supply to the electrode 6 and thereby improving the user's safety.

Figure 4:
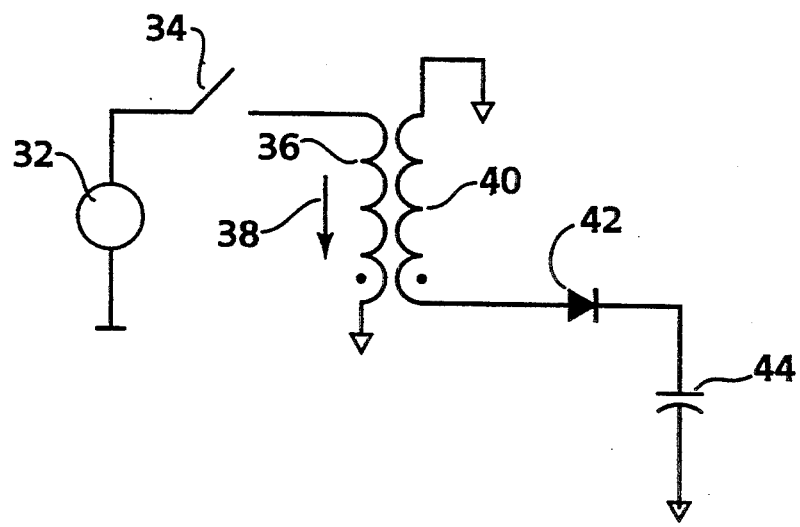
FIG. 4 shows an equivalent circuit of the power supply shown in FIG. 2.

Referring to FIG. 4, there is shown a simplified equivalent circuit of the power supply 22 (as shown in FIG. 2). In arc welding, the voltage of a welding power supply provided by a welding power machine is very variable depending on the current demand for welding. When the welding arc process is initiated, the contact impedance is very low. The output voltage of the machine drops to its lower level, which is about 12 volts. After warm up of the electrode, the impedance increases and the output voltage rises up to about 30 volts. When the electrode is removed from the workpiece, the output voltage rises up to 100 volts. The range between which the voltage varies is therefore determined by the typical voltage value during the arc welding process initiation and the open circuit voltage (when there is no welding activity). To provide and maintain substantially constant the DC supply voltage, the power supply 22 is based on a switching principle.

The welding power supply is schematically depicted by a source 32 of voltage applied on a switch 34. When the switch 34 closes, an instantaneous voltage is applied on a primary winding 36 of a high frequency transformer. A loading current depicted by arrow 38 is generated and charges the transformer inductance. On the transformer secondary winding 40, a negative voltage is produced on a diode 42 which stops the current flow. By opening the switch 34 after a given time period, a negative voltage will oppose against the current stop, causing conduction of the diode 42. When the diode conducts, a current flows from the secondary winding 40 to a capacitor 44. The capacitor 44 stores the energy from the secondary winding 40, producing a potential difference between the capacitor terminals. This energy will be consumed by a load to supply during the duty cycle of the primary winding 36. By repeating this operation several times per second, the time to load the inductance of the high frequency transformer will be inversely proportional to the voltage applied thereto. By means of an appropriate control circuit, the duty cycle of the transformer can be thereby adjusted as a function of the variations in the input voltage (welding power supply) and the output energy demand (DC supply voltage).

Figure 5:
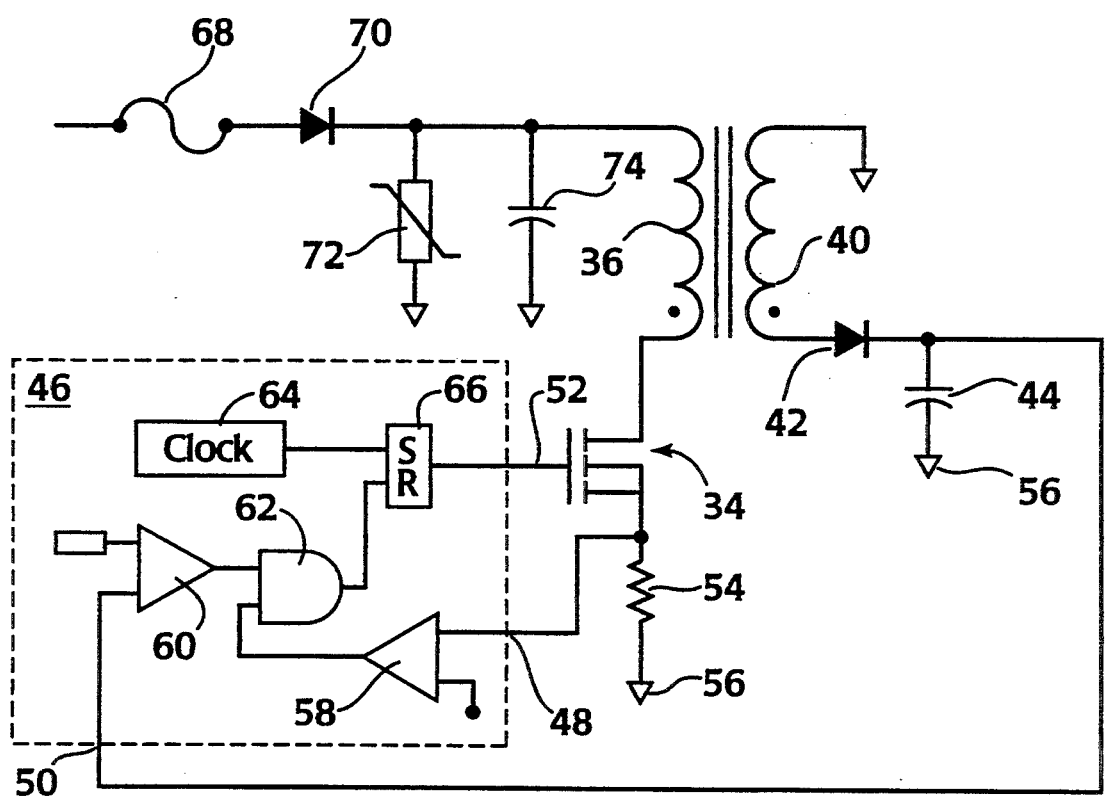
FIG. 5 shows a schematic diagram of the power supply shown in FIG. 2.

Referring to FIGS. 2 and 5, the basic combination of the power supply 22 consists in a high frequency transformer including a primary winding 36 connected to the input terminals 14, and a secondary winding 40, an ON-OFF switch 34, a switching control circuit 46 for alternately triggering the ON-OFF switch 34 as function of a voltage of the welding power supply at the input terminals 14, and a rectifier-filter circuit preferably comprising a diode 42 and a capacitor 44 connected in series with the secondary winding 40 for producing the DC supply voltage. The switching control circuit 46 has a first input 48 for receiving a measure current indicative of the voltage at the input terminals 14, a second input 50 for receiving a feedback voltage from the rectifier-filter circuit, and a control output 52 for operating the ON-OFF switch 34. The switching control circuit 46 includes comparator elements for comparing respectively the measure current and the feedback voltage with predetermined thresholds to produce a trigger signal on the control output 52, and a clock circuitry for synchronizing the trigger signal.

The measure current is derived from a voltage across a measurement resistor 54 connected between the ON-OFF switch 34 and a neutral point 56 of the power supply 22. The ON-OFF switch 34 may conveniently comprise a MOS transistor connected between the primary winding 36 and the measurement resistor 54, the transistor having a gate for receiving the trigger signal from the switching control circuit 46. The comparator elements of the switching control circuit 46 may conveniently comprise first and second comparators 58, 60 and a logic AND gate 62. The first comparator 58 has inputs for receiving the measure current and the corresponding threshold, and an output. The second comparator 60 has inputs for receiving the feedback voltage and the corresponding threshold, and an output. The AND gate 62 has inputs connected respectively to the outputs of the first and the second comparators 58, 60, and an output. The clock circuitry comprises a clock 64 and a R-S flip-flop 66 having inputs connected respectively to the clock 64 and the output of the AND gate 62, and an output for producing the trigger signal. In the rectifier-filter circuit, the capacitor 44 is more particularly connected to the neutral point 56, and the diode 42 is connected between the capacitor 44 and the secondary winding 40 of the high frequency transformer. The feedback signal is derived from a voltage point between the diode 42 and the capacitor 44.

The power supply 22 may preferably further comprise a fuse 68 in series with a diode 70 connected between the input terminals 14 and the high frequency transformer, and a varistor 72 in parallel with a capacitor 74 connected between the neutral point 56 and a point between the protection diode 70 and the primary winding 36. Power supply 22 is connected to the input terminals 14 of welding control unit 2 by lines 25 and 27. Input terminals 14 are directly connected to the output 12 of the welding power machine 4. Power supply 22, of welding control unit 2, provides a constant and stable DC supply voltage which is especially suitable for electrically supplying the electronic components inside welding control unit 2, such as cooling fans 28 which require a stable supply to ensure their optimal efficiency.

Figure 3:
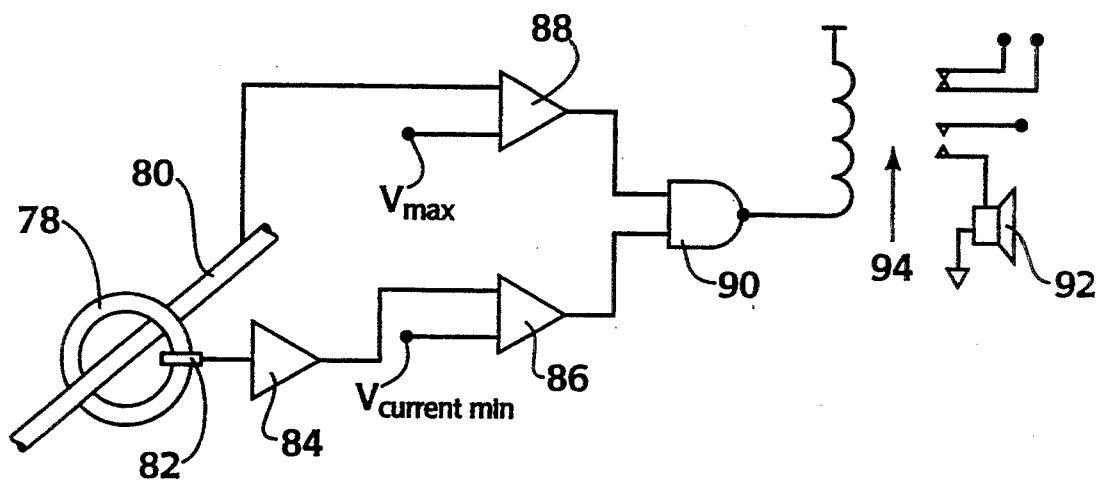
FIG. 3 shows a schematic diagram of the failure detecting circuit shown in FIG. 2.

Referring now to FIGS. 2 and 3, the welding control unit 2 (as shown in FIG. 1) preferably also comprises a failure detecting circuit 76 for detecting a failure relative to operation of the welding power switch 24. The failure detecting circuit 76 has a supply input for receiving the DC supply voltage from the power supply 22.

The failure detecting circuit 76 includes a current detector for detecting a current across the output terminals 16. The current detector may conveniently comprise a ferrite core 78 surrounding a conductor 80 connected between the welding power switch 24 and the output terminal 16, a magnetic field sensitive detector 82 coupled to the ferrite core 78, an amplifier 84 connected to the magnetic field sensitive detector 82, and a comparator 86 having a first input connected to the amplifier 84, a second input for receiving a current threshold $V_{current\ min}$, and an output for producing a signal indicative of the current across the output terminal 16. The failure detecting circuit 76 also includes a voltage detector which may conveniently comprise a comparator 88 having a first input connected to the output terminal 16, a second input for receiving a voltage threshold $V_{max}$, and an output for producing a signal indicative of the voltage at the output terminal 16. The failure detecting circuit 76 further includes a gating circuit having inputs connected respectively to the current detector and the voltage detector, for producing a gate signal. This gating circuit may conveniently comprise a logic NAND gate 90. The failure detecting circuit 76 also includes an alarm circuitry responsive to the gate signal produced by the logic NAND gate 90, for producing an alarm signal perceivable by a user (welder) upon occurrence of a failure.

The failure detecting circuit 76 permanently monitors the current and the voltage at the output terminals 16 to warn a user whenever a failure has been detected. The failure detecting circuit 76 is based on the fact that in arc welding, current and voltage are simultaneously present. The voltage detector responds to a voltage above about 10 volts on the output terminals 16. If the voltage is above 10 volts and there is no current across the output terminals 16, this means that there is an alarm condition or a failure. The current measurement is very important in determining occurrence of an alarm condition. The method for measuring the current is based on measurement of the magnetic field produced by a current flowing in the conductor 80. The magnetic field is channelled by the ferrite core 78 which is slightly open. The field is measured by the detector 82 inserted in the opening of the core 78. When the current flows, the detector 82 detects the presence of an induced magnetic field, which activates the level detector formed by the comparator 86, which detects if the current has reached a predetermined minimum threshold.

The alarm circuitry may comprise for example a buzzer 92 and a light indicator (not shown in the Figure) connected to a relay 94 responsive to the gate signal produced by the NAND gate 90, so that the alarm signal is both audible and visible. The relay 94 can also be used to produce a contactor triggering signal causing the contactor 20 (shown in FIG. 1) connected to the supply of the welding supply machine 4 to open upon occurrence of a failure. The contactor triggering signal is produced on contactor terminals 96 for suitable connection with the contactor 20.

Preferably, the welding control unit 2 is provided with a double ventilation cooling mechanism 28 of passive and active types.

Preferably, the welding control unit 2 should be able to operate with a welding voltage input going from 12 $V_{DC}$ to 120 $V_{DC}$, with a maximal current of at least 250 A at 35° C. for a continuous operation during more than 30 minutes, and of 300 A at 30° C. for an about 10% intermittent use. The response time to actuate the switch is about 1/15 s. and the deactivation time is about 1/30 s., with a contact sensitivity less than 500 ohms.

Such a welding control unit 2 is especially useful to protect the welders working in hostile environments such as turbine shafts, shipyards, underground sites, etc. The welding control unit 2 is usable anywhere between the welding machine 4 and the welding electrode 6. With the failure detecting circuit 76, a welder is always warned of a failure. The welding control unit 2 is supplied directly by the welding power supply and thus does not require additional supply wires. The installation is simple and fast, and the welding control unit 2 is efficient, fast and highly reliable. All these features improve the security aspect of the welding control unit 2. The connection of the unit 2 is very simple. The unit 2 only has to be connected to the welding power machine 4, the electrode 6 and the workpiece 8 with suitable cables. An additional connector is also available for stationary installations having the option of automatic disconnection of the welding power machine 4 through the contactor line 18 (shown in FIG. 1). The welding control unit 2 is entirely autonomous.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A welding control unit power supply for providing a substantially constant and powerful DC supply voltage derived from a high current welding power supply, the welding control unit having internal electronic components, and comprising:
    a high frequency transformer including a primary winding for receiving the welding power supply, and a secondary winding;
    an ON-OFF switch means connected in series with said primary winding;
    switching control means for alternately triggering said ON-OFF switch means as a function of a voltage of the welding power supply;
    a rectifier-filter circuit connected in series with said secondary winding for producing said DC supply voltage; and
    whereby said DC supply voltage electrically supplies power to the internal electronic components of the welding control unit and is maintained substantially constant by means of said switching control means even upon occurrence of significant voltage variations in the welding power supply.

2. A welding control unit power supply according to claim 1, wherein:
    said switching control means have a first input for receiving a measure signal indicative of said voltage of the welding power supply, a second input for receiving a feedback signal from said rectifier-filter circuit, and a control output for operating said ON-OFF switch means, said switching control means including comparator means for comparing respectively said measure signal and said feedback signal with predetermined thresholds to produce a trigger signal on said control output, and clock means for synchronizing said trigger signal.

3. A welding power control unit power supply according to claim 2, wherein:

said measure signal is derived from a voltage across a measurement resistor connected between said ON-OFF switch means and a neutral point;
said ON-OFF switch means comprise a transistor connected between said primary winding and said measurement resistor, said transistor having a gate for receiving said trigger signal;
said comparator means comprise first and second comparators and a logic AND gate, said first comparator having inputs for receiving respectively said measure signal and the corresponding threshold, and an output, said second comparator having inputs for receiving respectively said feedback signal and the corresponding threshold, and an output, said AND gate having inputs connected respectively to said outputs of the first and second comparators, and an output;
said clock means comprise a clock and a R-S flip-flop having inputs connected respectively to said clock and said output of the AND gate, and an output for producing said trigger signal; and
said rectifier-filter circuit comprise a capacitor connected to said neutral point, and a diode connected between said capacitor and said secondary winding, said feedback signal being derived from a voltage point between said diode and said capacitor.

4. A welding control unit power supply according to claim 1, further comprising a fuse in series with a protection diode connected between a point receiving said welding power supply and said primary winding, and a varistor in parallel with a capacitor connected between a neutral point and a point between said protection diode and said primary winding.

5. A welding control unit for controlling a high current welding power supply provided by a welding power source to an electrode for welding a workpiece, the welding control unit having internal electronic components and comprising:
    input means for receiving the welding power supply from the welding power source;
    output means respectively connectable to the welding electrode and the workpiece;
    a power supply for providing a substantially constant and powerful DC supply voltage derived from the welding power supply to the internal electronic components of the welding control unit, said power supply comprising:
    a high frequency transformer including a primary winding connected to said input means, and a secondary winding;
    an ON-OFF switch means connected in series with said primary winding;
    switching control means for alternately triggering said ON-OFF switch means as a function of a voltage of the welding power supply; and
    a rectifier-filter circuit connected in series with said secondary winding for producing said DC supply voltage;
    welding switch means connected between said input means and said output means, for controlling and welding power supply to the electrode;
    welding control means having a supply input for receiving said DC supply voltage, a detecting input for detecting a contact between the electrode and the workpiece, and a control output for operating said welding switch means as a function of the detected contact; and whereby said DC supply voltage is maintained substantially constant by means of said switching control means even upon occurrence of significant voltage variations in the welding power supply.

6. A welding control unit according to claim 5, further comprising failure detecting means for detecting a failure relative to operation of said welding switch means, said failure detecting means having a supply input for receiving said DC supply voltage, and including:

current detecting means for detecting a current across said output means;

voltage detecting means for detecting a voltage at said output means;

gate means having inputs connected respectively to said current detecting means and said voltage detecting means, for producing a gate signal;

alarm means responsive to said gate signal, for producing an alarm signal perceivable by a user upon occurrence of said failure.

7. A welding control unit according to claim 6, wherein said failure detecting means further include a relay responsive to said gate signal, for producing a contactor triggering signal causing a contactor connected to a supply of the welding supply source to open upon occurrence of said failure.

8. A welding control unit according to claim 6, wherein:

said current detecting means comprise a ferrite core surrounding a conductor connected between said welding switch means and said output means, a magnetic field sensitive detector coupled to said ferrite core, an amplifier connected to said magnetic field sensitive detector, and a comparator having a first input connected to said amplifier, a second input for receiving a current threshold, and an output for producing a signal indicative of said current across the output means;

said voltage detecting means comprise a comparator having a first input connected to said output means, a second input for receiving a voltage threshold, and an output for producing a signal indicative of said voltage at the output means; and said gate means are a logic NAND gate.

9. A welding control unit according to claim 6, wherein said alarm means comprise a buzzer and a light indicator connected to a relay responsive to said gate signal, so that said alarm signal is audible and visible.

10. A welding control unit according to claim 5, wherein:

said switching control means have a first input for receiving a measure signal indicative of the voltage at said input means, a second input for receiving a feedback signal from said rectifier filter circuit, and a control output for operating said ON-OFF switch means, said switching control means including comparator means for comparing respectively said measure signal and said feedback signal with predetermined thresholds to produce a trigger signal on the control output of said switching control means, and clock means for synchronizing said trigger signal.

11. A welding control unit according to claim 10, wherein:

said measure signal is derived from a voltage across a measurement resistor connected between said ON-OFF switch means and a neutral point;

said ON-OFF switch means comprise a transistor connected between said primary winding and said measurement resistor, said transistor having a gate for receiving said trigger signal;

said comparator means comprise first and second comparators and a logic AND gate, said first comparator having inputs for receiving said measure signal and the corresponding threshold, and an output, said second comparator having inputs for receiving said feedback signal and the corresponding threshold, and an output, said AND gate having inputs connected respectively to said outputs of the first and second comparators, and an output;

said clock means comprise a clock and a R-S flip-flop having inputs connected respectively to said clock and said output of the AND gate, and an output for producing said trigger signal; and said rectifier-filter circuit comprise a capacitor connected to said neutral point, and a diode connected between said capacitor and said secondary winding, said feedback signal being derived from a voltage point between said diode and said capacitor.

12. A welding control unit according to claim 5, wherein said power supply further comprises a fuse in series with a diode connected between said input means and said high frequency transformer means, and a varistor in parallel with a capacitor connected between a neutral point and a point between said protection diode and said primary winding.

13. A welding control unit according to claim 5, further comprising at least one fan for unit cooling purposes, said fan having a supply input for receiving said DC supply voltage.

* * * * *